Patented June 6, 1950

2,510,684

UNITED STATES PATENT OFFICE 2,510,684

PROCESS FOR THE MANUFACTURE OF SULFUR TRIOXIDE

Joseph Cathala, Toulouse, France

No Drawing. Application June 25, 1945, Serial No. 601,539. In Great Britain February 24, 1941

Section 1, Public Law 690, August 8, 1946
Patent expires February 24, 1961

9 Claims. (Cl. 23—174)

The invention relates to a process for the direct manufacture of sulphur trioxide in the liquid state by catalytic oxidation of a gaseous mixture containing sulphur dioxide and oxygen under a superatmospheric pressure of not less than 3 atmospheres.

It has already been proposed in British Patent Specification No. 467,298 to produce gaseous mixtures containing sulphur trioxide by the catalysis of sulphur dioxide in the presence of oxygen under pressures exceeding 5 atmospheres. Such process was particularly described in relation to gases, as normally used in current practice, containing 7% $SO_2$ and an excess of oxygen (as compared with the theoretical equivalent). With this type of mixture, the partial vapour pressure of the sulphur trioxide formed does not permit the condensation of the sulphur trioxide and therefore it cannot be extracted in the liquid state but must be absorbed by concentrated sulphuric acid, thus yielding oleum.

It has been proposed moreover in British Patent Specification No. 519,570 to manufacture the liquid sulphur trioxide directly by catalytic oxidation under atmospheric pressure of gaseous mixtures containing at least 30% $SO_2$. But an extensive study of the conditions governing the liquefaction of the sulphur trioxide proves that owing to the volatility of this compound, the vapour pressure of which amounts to about 250 mm. Hg, at 25° C., it is possible to liquefy only a part of the sulphur trioxide produced; the remaining part must be transformed into oleum. Moreover it is impossible to cool the mixture below 20° C. in case the sulphur trioxide solidifies, which is very troublesome in industrial practice, as once it is solid the sulphur trioxide is very difficult to melt again.

The proportion of the sulphur trioxide which escapes condensation in the liquid state is greater, the lower the degree of conversion and the farther the initial composition of the gaseous mixture is from the theoretical composition: 2 vol. $SO_2$ and 1 vol. $O_2$. In this particular case which is especially favourable, experiment proves that the amount of sulphur trioxide which can liquefy is less than 90% of that which is formed, if the degree of conversion amounts to 80%. Reducing this degree of conversion to 60–66%, to get a better yield from the catalyst, experiment proves that the amount of the sulphur trioxide which can liquefy is less than two thirds of that which is formed. With a mixture containing 30% $SO_2$, and with a 100% degree of conversion, it is only possible to liquefy a third of the $SO_3$ formed. It is clear that in all cases the manufacture of liquid sulphur trioxide involves a substantial production of oleum.

By the present invention it is made possible to obtain complete transformation of sulphur dioxide into liquid sulphur trioxide by catalytic oxidation of a gaseous mixture containing more than 15% $SO_2$ under a superatmospheric pressure of not less than 3 atmospheres.

By simultaneous use of pressure and high concentration of $SO_2$, a considerable reduction in size of apparatus required for a definite output of sulphur trioxide is gained. Moreover a theoretical consideration of the chemical equilibrium shows that for a definite conversion degree, it is possible to work at higher temperatures, thus increasing the speed of reaction and consequently increasing the output of a definite catalytic mass.

By carrying out the catalytic oxidation of mixture rich as to $SO_2$ under pressure, it is proved by experiment that the pressure has a very favourable effect on the liquefaction of the sulphur trioxide, as it increases greatly the solubility of the unoxidised sulphur dioxide in the liquid sulphur trioxide, giving a solution the freezing point of which is lowered considerably below 20° C. In these circumstances, a very important and unexpected result is obtained as it is possible to cool down without freezing to such low temperature that all the sulphur trioxide produced is extracted as a liquid with a large proportion of the unoxidised sulphur dioxide.

To obtain the gaseous mixture, it is possible to compress the mixture in convenient proportions of sulphur dioxide, oxygen, nitrogen or other inert gases to the pressure chosen. But it may be more expedient to compress only the oxygen, air or oxygenous gases required for the oxidation and to introduce the sulphur dioxide in liquid form in the circuit, evaporating the same under pressure at about the normal temperature, its concentration in the mixture being regulated very exactly by the chosen temperature of vaporisation.

In normal industrial practice for catalytic oxidation at normal pressure of dilute sulphur dioxide, experience shows that it is best to use a considerable excess of oxygen relative to the $SO_2$ present in the gases: one uses 7 to 10% $SO_2$ with 10 to 13% $O_2$ as opposed to the theoretical proportions: 3.5% $O_2$ for 7% $SO_2$ or 5% $O_2$ for 10% $SO_2$. On the other hand, working under pressure according to the present invention, it is always profitable to have a considerable excess of $SO_2$ concentration. On one hand, the specific heat of the sulphur dioxide which is in excess helps efficiently to reduce the rise in temperature during the catalytic oxidation; on the other hand, the presence of the excess sulphur dioxide increases the condensation of the sulphur trioxide for a definite temperature of condensation. Finally, the presence of an excess of sulphur dioxide moves the equilibrium limit so that there is practically complete consumption of the oxygen existing in the mixture, thus reducing the compression work required for the production of a definite quantity of sulphur trioxide.

The compressed gaseous mixture may be catalytically oxidised in a converter of which only an external shell stands up to the mechanical stresses from the internal pressure; one or several concentric shells, between which flows the gaseous mixture, providing protection of the external shell against excessive heating. The gaseous mixture goes through an internal heat exchanger in close contact with the catalytic mass which it cools; at the same time, it is progressively heated to a sufficient temperature to allow the catalyst to become active. If necessary the converter can be provided with a second internal heat exchanger where there is a current of air, steam or any suitable fluid to carry away the heat produced by the catalytic oxidation of sulphur dioxide.

The catalytic mass, as active as possible, may be platinum, vanadium oxide or any substance of similar catalytic properties. It is supported by a porous carrier, the shape of which may be chosen to reduce the friction losses due to the gaseous flow, so that the circulating gases will flow at great speed and so to obtain the greatest benefit from the increased reaction rate.

It is satisfactory, in practice, to maintain the temperature at the inlet of the gaseous mixture between 450° C. and 500° C. according to the catalytic activity. That temperature can be controlled by a proper choice of the size of the heat exchanger; moreover, it is possible to reduce it by special introduction of cool gases. In the first layers of the catalyst, the temperature of the gases increases very steeply, sometimes by more than 250° C. Such an increase greatly favours the thermal exchange with the incoming gases. As the increased molecular concentration of $SO_2$ and $O_2$ alters the theoretical equilibrium limit favourably, it is now possible to obtain satisfactory conversion within a big temperature interval, between 550° C. and 800° C. or above.

It is advantageous to recover the heat content of the gases which leave the catalytic mass at about 650° C. or above, by conducting them into a special boiler where they evaporate water or any suitable liquid, either at atmospheric pressure or at a pressure equal, lower or higher than the working pressure of the catalyst.

Afterwards, the cooling of the gaseous mixture is performed in a suitable cooler to condense the sulphur trioxide produced and a more or less important part of the remaining sulphur dioxide. The cooling can be carried out in one step but it is better to proceed by several steps furnishing separate liquid portions which have increasing concentration of sulphur dioxide and which freeze at temperature lower and lower, always below the freezing point of pure sulphur trioxide. Eventually, it may be profitable to stop the cooling before complete condensation of the sulphur trioxide and to extract the $SO_3$ remaining in the gaseous mixture by washing that mixture with liquid sulphur dioxide. The washing can be carried out in several steps, at some definite convenient temperature to avoid solidification of the sulphur trioxide and to give a definite concentration of sulphur dioxide in the remaining gases. That definite concentration may be sometimes the same as the initial concentration; sometimes that concentration can be reduced to a very low figure by choosing a low enough temperature.

According to their respective concentration in $SO_2$ and $O_2$ the gases can be passed over the catalyst again, with the addition of new gases. On the other hand, it is convenient, after removal of the last traces of $SO_2$ by washing or any physically or chemically suitable process, to expand them at atmospheric pressure in an expansion machine producing mechanical work and refrigeration. That refrigeration can be effectively used for the condensation of the sulphur dioxide and trioxide in the gaseous mixture.

The liquid mixture of $SO_2$ and $SO_3$ undergoes separation in a rectifying system including a boiler, a rectifying column and a condenser; the rectification can be proceeded with continuously or by batch operation. The liquid mixture is fed in one or several portions of varying composition to the respective heights of the column according to the best working conditions. The boiler may be heated by the steam produced in the first stage of cooling of the gases. It is possible to carry out the rectification under any chosen pressure, lower or higher than the catalyst working pressure, but it is expedient to choose a rectification pressure higher than 3 atmospheres allowing for liquefaction of pure $SO_2$ at the temperature of ordinary tap water. The separated liquid sulphur dioxide can be used for the washing process of the gases after catalysis, to free them from the sulphur trioxide remaining.

The invention is illustrated in the following non-limiting examples. All these examples correspond to experiments with the same catalytic mass with a basis of vanadium prepared according to the usual methods, the hourly output of the gasses corresponds to a catalyst occupying 1000 cubic centrimetres and weighing 1050 gms.

*Example 1.*—A mixture with 66% $SO_2$ and 34% $O_2$, compressed to 3 atm. was subject to catalysis with an hourly output of 15 cubic metres (S. T. P.). A degree of conversion of 60% was obtained. By cooling to 25° C. it was possible to condense 97% of the sulphur trioxide formed. It was possible, without any freezing of $SO_3$, to cool as low as 7° C. more than 99.5% of the sulphur trioxide being condensed.

*Example 2.*—A mixture with 66% $SO_2$ and 34% $O_2$ compressed to 6 atm. was subjected to catalysis with an hourly output of 32 cubic metres (S. T. P.). A degree of conversion of 70% was obtained with the composition of the gaseous mixture as: $O_2$, 13%; $SO_3$, 61%; $SO_2$, 26%. By cooling to 20° C. it was possible to condense 99% of the sulphur trioxide formed, the last liquid fraction containing 78 W% of $SO_2$ and the composition of the gases being $O_2$ 68%; $SO_2$, 32%. Without any freezing it was possible to cool as low as —10° C. condensing the last trace of $SO_3$ and reducing the proportion of $SO_2$ in the gases to about 15%. In the same experiment by cooling to 35° C. only, it was possible to condense 97.5% of the sulphur trioxide formed, the gaseous mixture containing about 40% $SO_2$. By washing with liquid sulphur dioxide at about 32°–33° C. it was possible to condense the last trace of $SO_3$ and the gases, which have a composition of: $SO_2$, 65%; $O_2$, 35%, are allowed to return to the catalyst.

*Example 3.*—A mixture of 2 vol. $SO_2$ and 5 vol. air was subjected to catalysis under 6 atm. pressure with an hourly output of 30 cubic metres (S. T. P.). A degree of conversion of 50% was obtained. By cooling to 20° C. it was possible to condense 96% of the sulphur trioxide formed. After cooling to about 7° C. the gases retained less than 1% of the sulphur trioxide formed. It was possible to absorb the last trace by washing with liquid sulphur dioxide at about 3°–5° C.

*Example 4.*—A mixture of 2 vol. $SO_2$ and 5 vol. air was subjected to catalysis under 9 atm. pressure with an hourly output of 42 cubic metres (S. T. P.). A degree of conversion of 60% was obtained. By cooling to 20° C. it was possible to condense about 94% of the sulphur trioxide formed. By cooling at 0° C. the gaseous mixture contained less than 1% of the sulphur trioxide formed. The concentration of sulphur dioxide has been reduced to 10%. It is clear that, by this procedure, it was possible to extract in liquid form as sulphur trioxide and sulphur dioxide more than 80% of the initial sulphur dioxide.

*Example 5.*—A mixture of 2 vol. $SO_2$ and 5 vol. air was subjected to catalysis under 9 atm. pressure with an hourly output of 32 cubic metres (S. T. P.). A degree of conversion of 80% was obtained. By cooling to 20° C. it was possible to condense 93.4% of the sulphur trioxide formed. The gaseous mixture was fed into a packed column and washed with liquid sulphur dioxide. At the exit, not one trace of sulphur trioxide was detected.

*Example 6.*—A mixture of 4 vol. $SO_2$ and 5 vol. air was subjected to catalysis under 9 atm. pressure with an hourly output of 45 cubic metres (S. T. P.). The $SO_2$ concentration in the gaseous mixture was practically twice that of the theoretical concentration corresponding to the oxygen present. After catalytic oxidation, the gaseous mixture had the composition $N_2$, 49.8%; $O_2$, 0.3%; $SO_3$, 24.5%; $SO_2$, 25.4%, according to a degree of conversion of 97% for the oxygen and of about 50% for the sulphur dioxide. Experimental study of the condensation indicates that by cooling to 20° C. it is possible to condense 97.5% of the sulphur trioxide formed; moreover by cooling to 7° C. it is possible to condense about 99.5% with the latest liquid fraction containing more than 80 W% of sulphur dioxide. In practice, complete condensation of the sulphur trioxide was carried out in three stages. The first liquid fraction condensed by cooling to 35° C. takes about 90% of the sulphur trioxide giving a liquid with 25 W% sulphur dioxide. The second fraction, condensed by cooling to 0° C. takes practically all the remaining sulphur trioxide, giving a liquid with 70 W% sulphur dioxide. The third fraction, by cooling to about −40° C. gives a liquid with only less than 0.4 W% sulphur trioxide. The two first fractions are fractionated to separate the $SO_2$ and $SO_3$. The third is sent straight back to the catalytic circuit. After cooling, the concentration of sulphur dioxide in the gaseous mixture is about 2.6%. It is clear that it was possible to extract in liquid form as sulphur trioxide and sulphur dioxide more than 97% of the initial sulphur dioxide. By simple washing with water under pressure, it was possible to extract the remaining sulphur dioxide before expanding the gaseous mixture in an expansion machine which produced the refrigeration needed to cool the gases from 20° C. to −40° C.

*Example 7.*—A gaseous mixture produced by burning sulphur with a little excess air, the composition of which was $N_2$, 79%; $O_2$, 5%; $SO_2$, 16%, was subjected to catalysis under 9 atm. pressure with an hourly output of 30 cubic metres (S. T. P.). A degree of conversion of 50% for $SO_2$ was obtained. By cooling to 20° C. it was possible to condense about 80% of the sulphur trioxide and the liquid containing about 20 W% of sulphur dioxide was sent to the rectifying system. The gaseous mixture was washed practically free of $SO_3$ by liquid $SO_2$ at about 15° C.; the solution was likewise sent to the rectifying system. The gaseous mixture was cooled to about 0° C. giving liquid $SO_2$ necessary for the previous washing. Finally, the gases were cooled at about −40° C. to reduce the concentration of the remaining sulphur dioxide to about 2.5% as in Example 6. By washing with water under pressure at about 5° C. it was possible to recover the last remaining sulphur dioxide and after expansion the remaining gases were expelled into the air without any significant concentration of noxious gases.

*Example 8.*—The gaseous mixture issuing from a roasting furnace, the composition of which, after drying, was as: $N_2$, 79%; $O_2$, 7.1%; $SO_2$, 13.9%, was compressed to 6 atmospheres and subjected to catalysis after washing with liquid sulphur dioxide at about 5° C., the composition of the mixture being now as $N_2$, 69.3%; $O_2$, 6.2%; $SO_2$, 24.5%. With an hourly output of 32 cubic metres (S. T. P.) the composition of the gaseous mixture was $N_2$, 73.7%; $O_2$, 0.2%; $SO_2$, 13.6%; $SO_3$, 13.0%. It is clear that the degree of conversion was 97% for the oxygen and 49% for the sulphur dioxide. By cooling at 20° C. it was possible to condense 80% of the sulphur trioxide formed, giving a liquid containing about 21 W% $SO_2$; this liquid was rectified. Washing at about 18° C. with liquid sulphur dioxide, condensed the remaining sulphur trioxide and the washing solution was rectified. The gaseous mixture was now cooled down to −40° C., and the last remaining sulphur dioxide was absorbed by washing under pressure with concentrated calcium chloride aqueous solution and from this, the sulphur dioxide was recovered by heating. After expansion to atmospheric pressure, the concentration of the sulphur dioxide was less than 0.05%. It is clear that it is possible to obtain more than 99% of the initial sulphur dioxide as liquid sulphur trioxide, the remaining sulphur dioxide being stored in the catalytic system as liquid sulphur dioxide.

What I claim is:

1. A process for the manufacture of a liquid mixture of pure sulphur dioxide and sulphur trioxide by reacting sulphur dioxide with oxygen in presence of an active catalyst, comprising preparing a gaseous mixture of sulphur dioxide and oxygen in a proportion almost equal to but less than that theoretically necessary for converting the sulphur dioxide to sulphur trioxide, passing said mixture over said catalyst at a rate of flow which will produce conversion of between 80 and 50% of the sulphur dioxide to sulphur trioxide, at a pressure not less than 3 atmospheres and at a temperature between 450 and 800° C., extracting the processed gas including at least 50% of sulphur trioxide and at least 20% of unreacted sulphur dioxide, cooling said gas down to a temperature to condense it to a solution of sulphur dioxide and sulphur trioxide the dioxide concentration of which is sufficient to avoid freezing.

2. A process for the manufacture of sulphur trioxide in the liquid state according to claim 1, in which the gases completely freed from sulphur trioxide are cooled to very low temperature to condense the major part of the remaining sulphur dioxide and the said gases are completely freed of the remaining sulphur dioxide by contact with a suitable absorbent, the gases being finally expanded to atmospheric pressure to produce the amount of refrigeration needed in the cooling process and part of the mechanical work required by the compression of the gaseous mixture.

3. A process for manufacturing sulphur trioxide in the liquid state according to claim 1, in which the gaseous mixture undergoing catalysis is obtained by compressing the oxygen containing gas necessary for the oxidation, adding to said gas liquid sulphur dioxide, and evaporating said dioxide under pressure while controlling its concentration in the mixture by controlling the vaporization temperature.

4. A process for manufacturing sulphur trioxide in the liquid state according to claim 1, in which said gaseous mixture contains a proportion of sulphur dioxide between one and two times the amount theoretically corresponding to the oxygen present in the mixture.

5. A process for manufacturing sulphur trioxide in the liquid state according to claim 1, in which said gaseous mixture contains a proportion of oxygen low enough to be practically converted to sulphur trioxide.

6. A process for manufacturing sulphur trioxide in the liquid state by reacting sulphur dioxide with oxygen in the presence of an active catalyst, comprising preparing a gaseous mixture of sulphur dioxide and oxygen containing more than 15% of sulphur dioxide and containing oxygen in a proportion almost equal to but less than that theoretically necessary for converting the sulphur dioxide to sulphur trioxide, passing said mixture over said catalyst at a rate of flow which will produce conversion of between 80 and 50% of the sulphur dioxide to sulphur trioxide at a pressure of not less than 3 atmospheres and at a temperature between 450 and 800° C., extracting the processed gas including at least 50% of sulphur trioxide and at least 20% of unreacted sulphur dioxide cooling said gas down to a temperature to condense it to a solution of sulphur dioxide and sulphur trioxide, the dioxide concentration of which is sufficient to avoid any freezing, and separating sulphur trioxide from said solution.

7. A process for manufacturing sulphur trioxide in the liquid state by reacting sulphur dioxide with oxygen in the presence of an active catalyst, comprising preparing a gaseous mixture of sulphur dioxide and oxygen containing more than 15% of sulphur dioxide and containing oxygen in a proportion almost equal to but less than that theoretically necessary for converting the sulphur dioxide to sulphur trioxide, passing said mixture over said catalyst at a rate of flow that produces conversion of between respectively 80 and 50% of the sulphur dioxide to sulphur trioxide, at a pressure not less than 3 atm. and at a temperature between 450 and 800° C., extracting the processed gas including at least 50% of sulphur trioxide and at least 20% of unreacted sulphur dioxide, cooling said gas in a first step to condense it partially to a mixture of sulphur dioxide and trioxide as a first solution relatively rich in trioxide, cooling the non condensed processed gas in successive steps at decreasing temperature to condense it to solutions richer and richer in sulphur dioxide while avoiding freezing for said solutions due to concentration increase of sulphur dioxide with temperature decrease, and separating sulphur trioxide from said first and successive solutions by distillation.

8. A process for manufacturing sulphur trioxide in the liquid state according to claim 7 in which the first and successive solutions according to their respective compositions are continuously fed to a rectification zone in which sulphur trioxide is separated from sulphur dioxide which is at least partially recovered for further use.

9. A process for manufacturing sulphur trioxide in the liquid state by reacting sulphur dioxide with oxygen in the presence of an active catalyst, comprising preparing a gaseous mixture of sulphur dioxide and oxygen containing more than 15% of sulphur dioxide and containing oxygen in a proportion almost equal to but less than that theoretically necessary for converting the sulphur dioxide to sulphur trioxide, passing said mixture over said catalyst at a rate of flow that produces conversion of between respectively 80 and 50% of the sulphur dioxide to sulphur trioxide, at a pressure not less than 3 atm., and a temperature between 450 and 800° C., extracting the processed gas including at least 50% of sulphur trioxide and at least 20% of unreacted sulphur dioxide, cooling said gas down to a temperature to condense it partially to a solution of sulphur dioxide and sulphur trioxide, the dioxide concentration of which is sufficient to avoid any freezing, washing the non condensed processed gas with liquid sulphur dioxide to remove the last traces of sulphur trioxide and regulate the final concentrations of sulphur dioxide in the remaining gases to not higher than the initial concentration, and separating sulphur trioxide from said condensed solution and said washing liquid sulphur dioxide.

JOSEPH CATHALA.

REFERENCES CITED

The following references are of record in the file of this patent:

UNITED STATES PATENTS

| Number | Name | Date |
|---|---|---|
| 1,506,963 | Andrews | Sept. 2, 1924 |

FOREIGN PATENTS

| Number | Country | Date |
|---|---|---|
| 467,298 | Great Britain | June 15, 1937 |

OTHER REFERENCES

Mellor: Inorg. and Theo. Chem. (vol. 10), page 345 (1930), Longmans, Green and Co., N. Y.